United States Patent
Welter et al.

(10) Patent No.: US 9,809,067 B2
(45) Date of Patent: Nov. 7, 2017

(54) AIR MAINTENANCE TIRE

(71) Applicant: The Goodyear Tire & Rubber Company, Akron, OH (US)

(72) Inventors: Carolin Anna Welter, Schleich (DE); Andreas Frantzen, Trier (DE); Jeannot Frieden, Uebersyren (LU); Anne Therese Peronnet-Paquin, Luxembourg (LU); Stephan Rodewald, Canal Fulton, OH (US); Joseph John Kulig, Tallmadge, OH (US); Mingliang Du, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 300 days.

(21) Appl. No.: 14/549,967

(22) Filed: Nov. 21, 2014

(65) Prior Publication Data
US 2015/0165842 A1   Jun. 18, 2015

Related U.S. Application Data

(60) Provisional application No. 61/915,678, filed on Dec. 13, 2013, provisional application No. 61/915,686, filed on Dec. 13, 2013.

(51) Int. Cl.
| | | |
|---|---|---|
| *B60C 23/12* | (2006.01) | |
| *B60C 13/02* | (2006.01) | |
| *B60C 1/00* | (2006.01) | |
| *C08K 5/39* | (2006.01) | |
| *C08K 5/3415* | (2006.01) | |
| *C08K 5/01* | (2006.01) | |
| *C08K 5/103* | (2006.01) | |
| *C08L 21/00* | (2006.01) | |

(52) U.S. Cl.
CPC ............ *B60C 23/12* (2013.01); *B60C 1/0025* (2013.01); *B60C 13/02* (2013.01); *C08K 5/01* (2013.01); *C08K 5/103* (2013.01); *C08K 5/3415* (2013.01); *C08K 5/39* (2013.01); *C08L 21/00* (2013.01)

(58) Field of Classification Search
CPC ....... B60C 23/12; B60C 13/02; B60C 1/0025; C08K 5/39; C08K 5/3415; C08K 5/01; C08K 5/103; C08L 21/00
USPC ........................................................ 152/525
See application file for complete search history.

(56) References Cited

U.S. PATENT DOCUMENTS

| | | |
|---|---|---|
| 7,207,366 B2 | 4/2007 | Sandstrom et al. |
| 7,231,951 B2 | 6/2007 | Sandstrom et al. |
| 7,533,707 B2 | 5/2009 | Sandstrom et al. |
| 7,534,828 B2 | 5/2009 | D'Sidocky et al. |
| 7,549,454 B2 | 6/2009 | Azer |
| 7,566,748 B2 | 7/2009 | Sandstrom |
| 7,694,708 B2 | 4/2010 | Agostini et al. |
| 7,714,051 B2 | 5/2010 | Hahn |
| 7,789,119 B2 | 9/2010 | Agostini et al. |
| 8,042,586 B2 | 10/2011 | Losey et al. |
| 8,113,254 B2 | 2/2012 | Benedict |
| 2002/0173577 A1 | 11/2002 | Deevers |
| 2009/0044892 A1 | 2/2009 | Lippello, III et al. |
| 2009/0048400 A1 | 2/2009 | Jung et al. |
| 2011/0146868 A1* | 6/2011 | Losey .................. B60C 23/12 152/426 |
| 2012/0073716 A1 | 3/2012 | Benedict |
| 2013/0160927 A1 | 6/2013 | Hinque et al. |
| 2013/0160928 A1 | 6/2013 | Hinque et al. |
| 2013/0160929 A1 | 6/2013 | Frantzen |
| 2013/0160931 A1 | 6/2013 | Sportelli et al. |

FOREIGN PATENT DOCUMENTS

EP            2028022 A1     2/2009

* cited by examiner

*Primary Examiner* — Angela C Scott
(74) *Attorney, Agent, or Firm* — John D. DeLong

(57) ABSTRACT

A self-inflating tire assembly includes an air tube mounted within a tire sidewall groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. The sidewall groove extends into an annular, axially extending, sidewall surface such as an axially oriented surface of a tire chafer protrusion located in non-contacting relationship with the rim. The opposite groove surfaces comprise a rubber composition, the rubber composition comprising: a diene based rubber; from 0.25 to 5 parts by weight, per 100 parts by weight of rubber (phr), of a self-lubrication agent capable of migrating from the rubber composition to the groove surface and disposing on the groove surface as a liquid; and from 1 to 15 parts by weight, per 100 parts by weight of rubber (phr), of a vulcanization modifier for use in the second rubber composition include α,ω-bis(N,N'-dihydrocarbylthiocarbamamoyldithio)alkanes, bismaleimides, and biscitraconimides.

18 Claims, 4 Drawing Sheets

AIR MAINTENANCE TIRE

This invention was made with Government support under contract number DEEE0005447 awarded by DOE. The Government has certain rights in the invention.

FIELD OF THE INVENTION

The invention relates generally to air maintenance tires and, more specifically, to a tire assembly incorporating an air pumping mechanism into a tire for maintaining tire air pressure.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

U.S. Pat. No. 8,042,586 discloses a self-inflating tire assembly that includes an air tube mounted within a tire sidewall groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. The sidewall groove extends into an annular, axially extending, sidewall surface such as an axially oriented surface of a tire chafer protrusion located in non-contacting relationship with the rim.

SUMMARY OF THE INVENTION

There is disclosed a self-inflating tire assembly includes an air tube mounted within a tire sidewall groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. The sidewall groove extends into an annular, axially extending, sidewall surface such as an axially oriented surface of a tire chafer protrusion located in non-contacting relationship with the rim. The opposite groove surfaces comprise a rubber composition, the rubber composition comprising: a diene based rubber; from 0.25 to 5 parts by weight, per 100 parts by weight of rubber (phr), of a self-lubrication agent capable of migrating from the rubber composition to the groove surface and disposing on the groove surface as a liquid; and from 1 to 15 parts by weight, per 100 parts by weight of rubber (phr), of a vulcanization modifier for use in the second rubber composition include α,ω-bis(N,N'-dihydrocarbylthiocarbamoyldithio)alkanes, bismaleimides, and biscitraconimides.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which they interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tire's footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

The present invention is directed to a self-inflating tire assembly includes an air tube mounted within a tire sidewall groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. The sidewall groove extends into an annular, axially extending, sidewall surface such as an axially oriented surface of a tire chafer protrusion located in non-contacting relationship with the rim. The opposite groove surfaces comprise a rubber composition, the rubber composition comprising: a diene based rubber; from 0.25 to 5 parts by weight, per 100 parts by weight of rubber (phr), of a self-lubrication agent capable of migrating from the rubber composition to the groove surface and disposing on the groove surface as a liquid; and from 1 to 15 parts by weight, per 100 parts by weight of rubber (phr), of a vulcanization modifier for use in the second rubber composition include α,ω-bis(N,N'-dihydrocarbylthiocarbamamoyldithio)alkanes, bismaleimides, and biscitraconimides.

Figure 1:
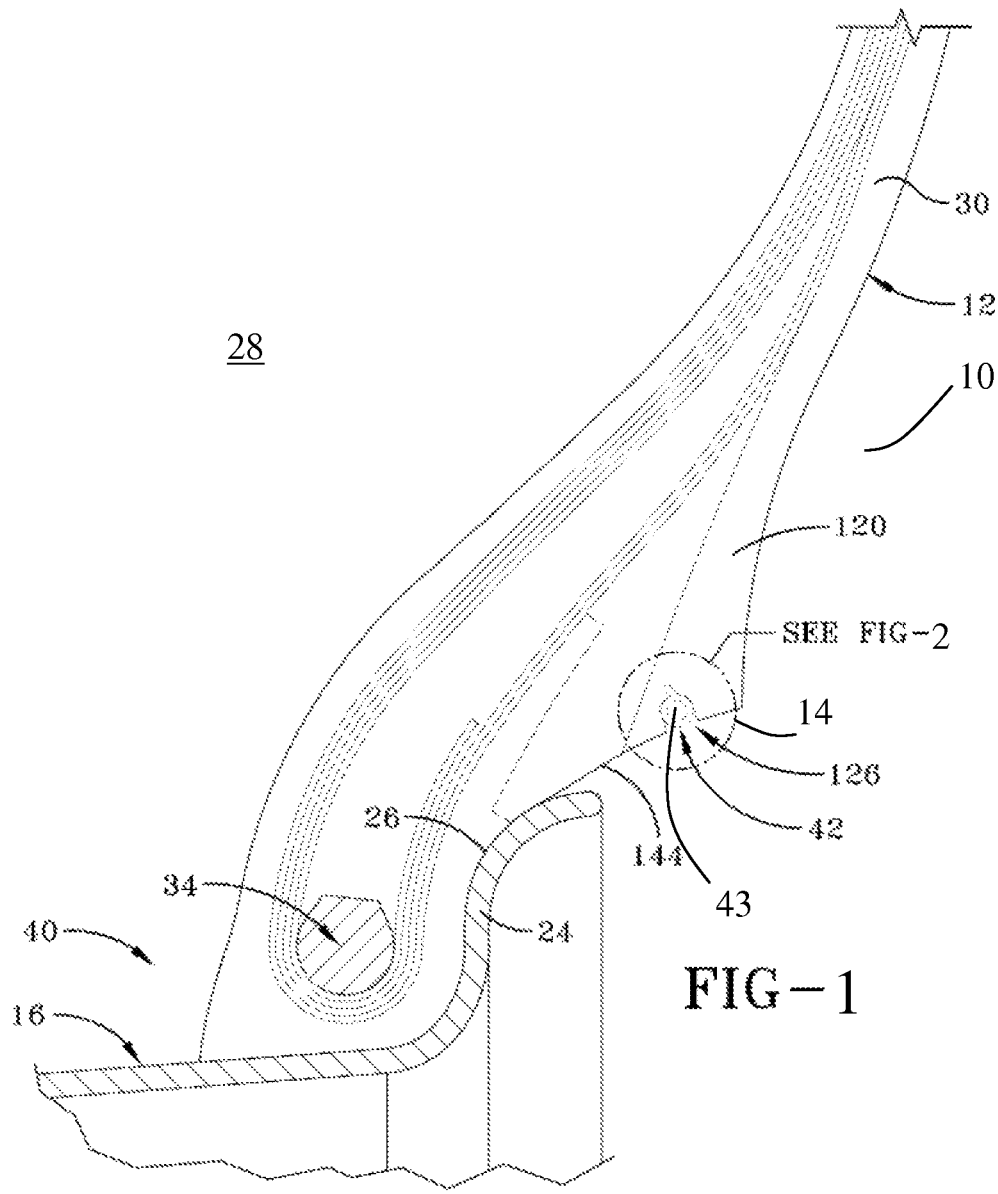
FIG. 1 is a section view of the air tube, tire, and rim assembly with the air tube located within a configured sidewall groove pursuant to the invention.

Referring to FIG. 1, a cut away section of a tire assembly 10 is shown. Tire assembly 10 includes a tire 12, a peristaltic pump assembly 14, and a tire rim 16. The tire mounts in conventional fashion to the rim 16. The tire is of conventional construction, having a pair of sidewall 30 extending from bead area 40 with bead 34 to a crown or tire tread region (not shown). The tire and rim enclose a tire cavity 28.

Figure 2:
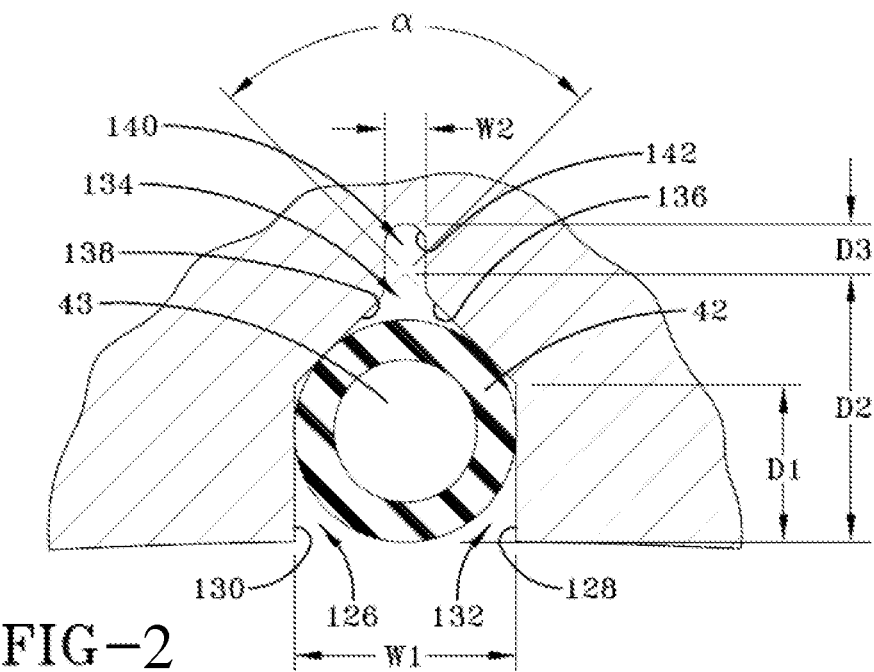
FIG. 2 is an enlarged section view of the air tube within the configured groove of FIG. 1 with the tube in an un-flat condition.
Figure 3:
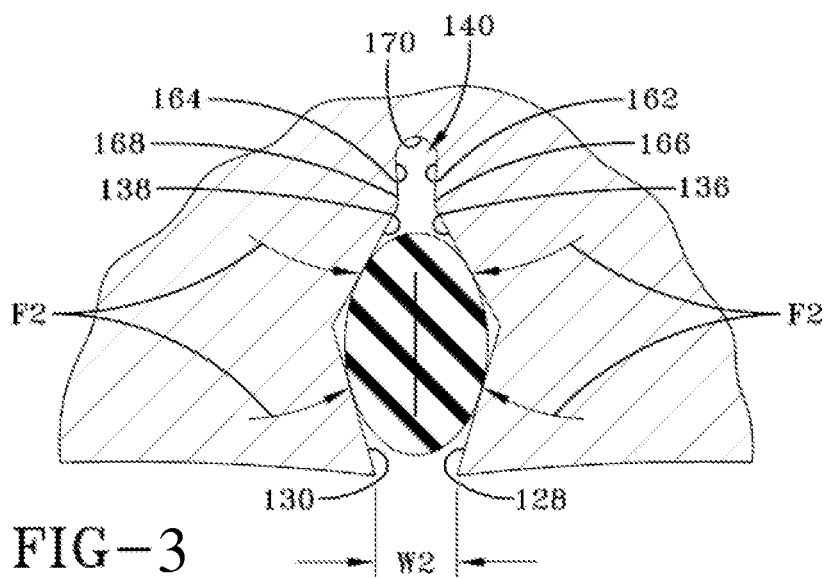
FIG. 3 is an enlarged section view of the air tube within the configured groove of FIG. 1 with the tube in a flat condition.

As seen from FIGS. 2 and 3, the peristaltic pump assembly 14 includes an annular air tube 42 that encloses an annular passageway 43. The tube 42 is formed of a resilient, flexible material such as plastic or rubber compounds that are capable of withstanding repeated deformation cycles. So constructed, the tube may deform within a tire into a flattened condition subject to external force and, upon removal of such force, return to an original sectional configuration. In the embodiment shown, the cross-section of the tube in an unstressed state is generally circular but other alternative tube geometries may be employed if desired. The tube is of a diameter sufficient to operatively pass a requisite volume of air sufficient for the purpose of pumping air into the tire cavity to maintain the tire 12 at a preferred inflation pressure.

The tube 42 mounts closely within a groove 126 in the tire and sequentially flattens as the tire rotates. The segment by segment flattening of the tube as the tire rotates operates to pump air along the air passageway 43; air which is then directed into the tire cavity 28 to maintain air pressure. A peristaltic pumping system employing a tube within a sidewall groove is shown in issued U.S. Pat. No. 8,042,586, incorporated herein by reference in its entirety.

FIG. 1 shows a preferred location for the air tube assembly 14. The tube 42 is located within a groove 126 in the sidewall 30 of the tire 12. The tube 42 as will be explained is closed by compression strain bending the sidewall groove 126 within a rolling tire footprint. The location of the tube 42 in the sidewall 30 affords the user freedom of placement and avoids contact between the tube 42 and the rim flange 16 at surface 26. The higher placement of the tube 42 in the sidewall groove 126 uses the deformation of the sidewall as it passes through the tire footprint to close the tube and provide the pumping action rather than pinching the tube.

The configuration and operation of the groove 126 to flatten the tube 42 is shown in FIGS. 2 and 3. The groove 126 is defined by parallel entryway sidewalls 128, 130 at a groove entryway opening 132 having a nominal width W1. The width W1 is sufficient to closely admit the tube 42 with interference but without constricting the air passageway 43 extending through the tube 42. An interior generally triangular shaped groove portion 134 is defined between convergent groove sidewalls 136, 138. The sidewalls 136, 138 intersect entryway sidewalls 130, 128, respectively at an obtuse angle. The sidewalls 136, 138 converge inwardly at an angle α of approximately ninety degrees and contact the sides of the tube 42 in the position shown by FIG. 1A. The sidewalls 136, 138 then converge inwardly to an inward U-shaped groove flex region 140 of a narrower width W2 defined between sidewalls 162, 164 as shown in FIG. 3. The sidewalls 162, 164 intersect respectively sidewalls 136,138 at an obtuse angled junction designated by numerals 166, 168. The sidewalls 162, 166 extend to an inward radius end 142 of the U-shaped groove flex region 140. In the tube-expanded condition of FIG. 1A, the contact of surfaces 136, 138 and 128, 130 against the tube 42 is sufficient to hold the tube 42 within the groove 126.

The location of the pump assembly 14 within the tire sidewall is distanced from the rim 16 as shown. A preferred location of the pump assembly tube 42 is within a groove 126 positioned in a generally axially extending chafer surface 144. The chafer 120 extends from the rim 16 and the location of the groove 126 within the surface 144 allows a separation of the tube 42 from the rim flange 24 while efficiently transferring tube closing forces from sidewall deformation to the tube 42. As will be apparent from a combined consideration of FIGS. 2 and 3, the tube 42 positioned within groove 126 is closed or flattened by compression due to tire sidewall 30 bending in the tire footprint 100. The force from the footprint imposes an axial directed force F2 into the sidewall 30 which acts to close the groove 126 from the open configuration of FIG. 2 to the closed configuration of FIG. 3. As a result, the entryway opening 132 of the groove 126 constricts to a width dimension W2 and the groove sidewalls 128, 130 and 136, 138 are forced inward. Inward pressure from the sidewalls 128, 130 and 136, 138 against the tube 42 causes the affected segment of the tube 42 to flatten and thereby pump air evacuated therefrom along unaffected segments of the air passageway 43. Surfaces 128, 130 and 136, 138 extend from the narrower inward groove surfaces 162, 164 defining groove portion 134. Compression forces F2 act to close the groove 126 as surfaces 162, 164 and the respective surfaces 128, 130, 136, 138 extending therefrom pivot inwardly about the radius end 142 of the groove portion 140. The angled relationship and profile of the surfaces 128, 130 to respective counterparts 136, 138 and 162, 164, extending from the inward U-shaped groove portion 134, act to close such surfaces inward evenly about the circumference of the tube 42 within the groove 126. Accordingly, the compression forces F2 transferred into the tube 42 by the surfaces 128, 130, 136, 138 are distributed about the circumference of the tube, causing an even and symmetrical flattening of the tube 42. An even and efficient pumping of evacuated air from the affected tube segment results. The affected segment of the tube 42 that is flattened is only that segment within the tire footprint. As the tire continues to rotate, each flattened segment will resume its original configuration as represented in FIG. 2 as an adjacent segment within the tire footprint is flattened.

Figure 4:
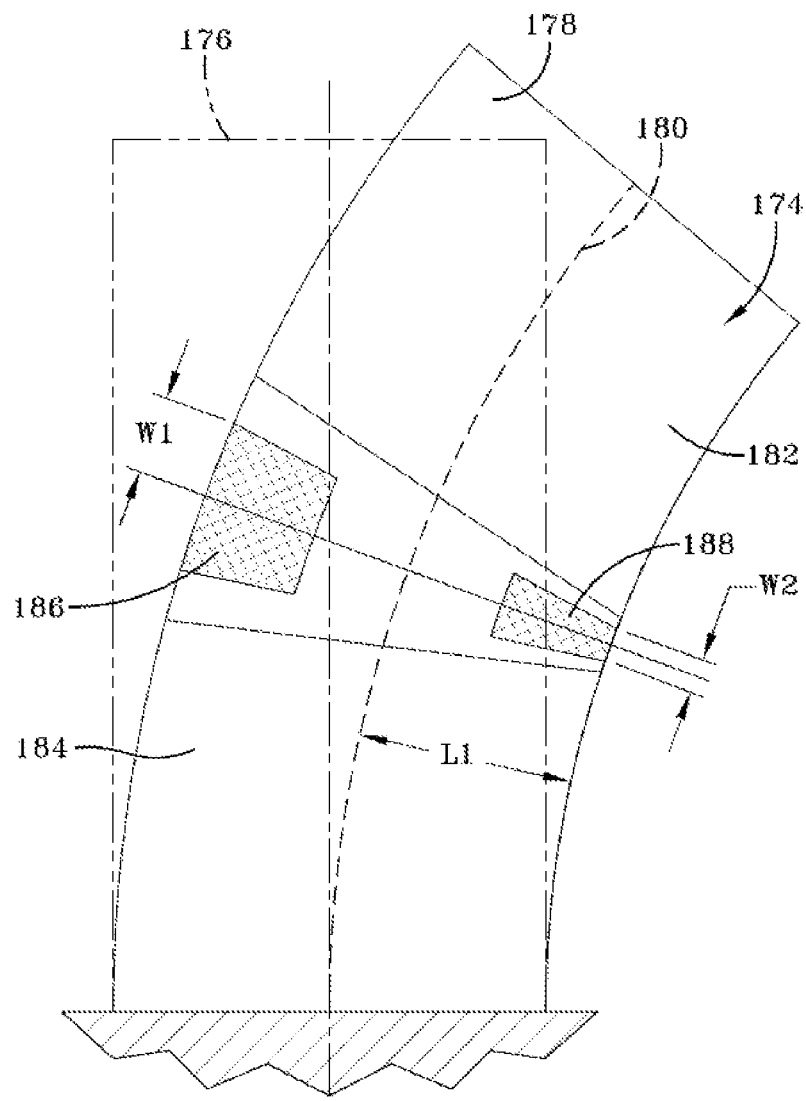
FIG. 4 is a schematic representation of a bending region of a tire sidewall adjacent a rolling tire footprint.
Figure 5:
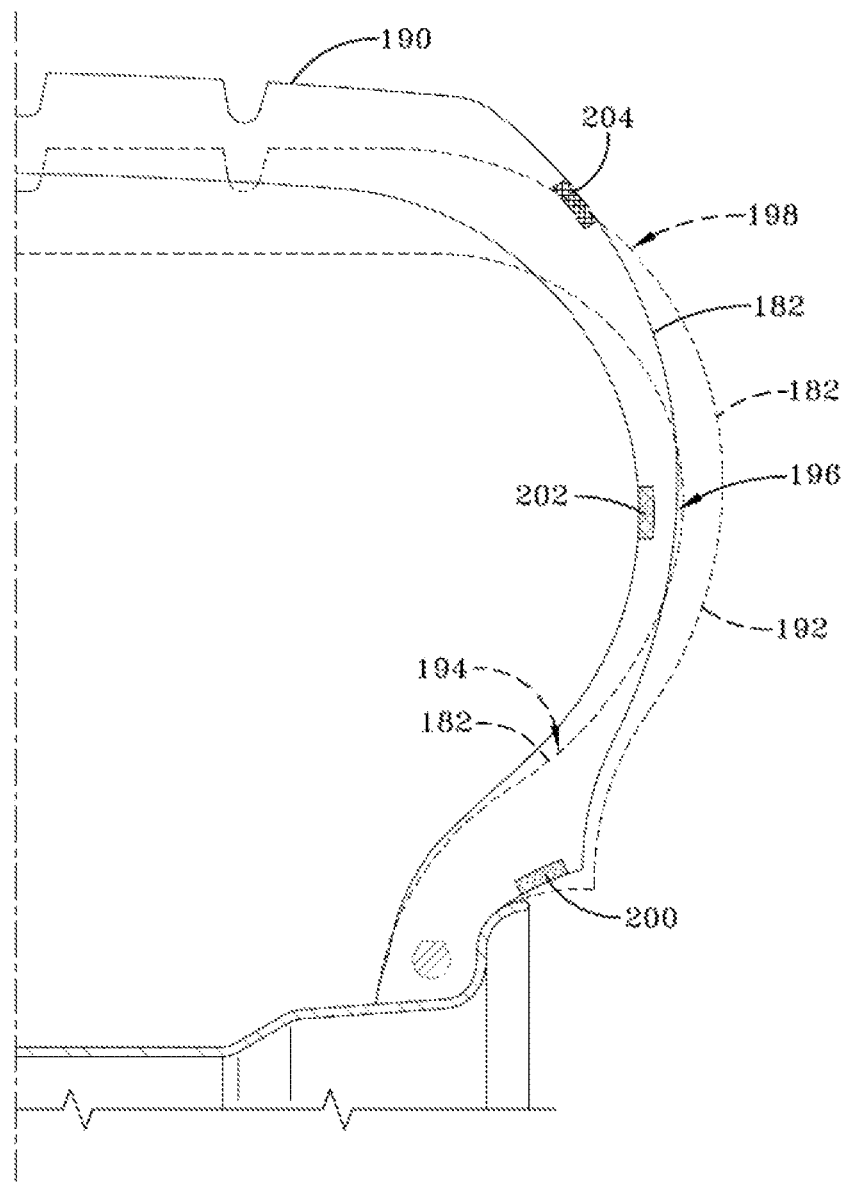
FIG. 5 is a schematic representation of a tire transforming from an original configuration into a bending configuration adjacent a rolling tire footprint, whereby forming multiple bending regions.

FIGS. 4 and 5 illustrate in schematic representation the placement of the groove and air tube within a tire. As will be appreciated, the sidewalls of a rolling tire generally bend and undergo a geometric transformation from bending strain introduced into the sidewalls as the tire rolls against a ground surface. The bending strain within sidewall regions adjacent to a tire footprint causes the radius of curvature within certain such sidewall regions of the sidewalls to bend to a greater extent. In a bending region 174 of a sidewall, the region transforms from the unstrained configuration shown at 176 into the bending configuration shown at 178. In the bending condition, the region 174 will have a neutral axis 180 that is not under strain; a compression side 182 of the neutral axis 180 of the region 174 that is under compression, and an elongation side of the neutral axis 180 of the region 174 that under elongation. For placement of the groove and air tube, a bending region of the sidewall is selected that will experience bending strain when that region is adjacent to the tire footprint. The compression side 182 of the region 174 is satisfactory for placement of the groove and tube assembly 188 since a compression of the side 182 of the region 174 will cause the groove to close around the air tube. To the contrary, the elongation side 184 of the region 174 is unsatisfactory for such a side under elongation strain, will cause the groove to widen rather than close, and not result in a flattening of the tube. Placement of the groove and tube assembly 188 should further be placed within the compression side 182 of the region 178 at a location farthest removed from the neutral axis 180, for such a location will experience the greatest compression strain. Location of the groove and tube 188 farthest from the neutral axis 180 of the selected bending region 174 will accordingly expose the groove to maximum closing due to a maximum compression force and bending imposed upon the tire region surrounding the groove. As a result, efficient and complete closing and collapse of the groove will be effected, causing an equally efficient and complete flattening of the air tube within the groove.

FIG. 5 illustrates in schematic form three sidewall regions of a sidewall that undergo curvature bending transformation when adjacent to a tire footprint. The original tire shape 190 is shown and configuration 192 is superimposed to show tire deformation adjacent to a tire footprint. Three bending regions 194, 196, 198 (for the purpose of illustration) are identified that will undergo strain-induced radius of curvature transformation adjacent a rolling tire footprint. Other regions are available and may be selected for groove and air tube placement if desired. As shown, bulging of the tire into the configuration 178 causes the regions 194, 196, 198 to bend to a greater extend (i.e. at a reduced radius) than within the original configuration 176. Each region 194, 196, 198 will have a neutral, unstrained axis, a compression side of the axis, and an elongation side of the axis as explained above in reference to FIG. 4. A groove and tube assembly 200, 202, or 204 will be positioned to the compression side 182 of the region selected, so that the compression of the compression side 182 will act to bend and constrict a segment of the groove adjacent to the tire footprint. Bending and constriction of the groove segment adjacent the tire footprint will commensurately cause a bending and flattening of an air tube segment within the bending groove segment, whereby pumping evacuated air from the flattened air tube segment along the air tube passageway. Positioning the groove and air tube within a bending region of the sidewall thus operates to utilize the bending compression strain within the region to effect a bending and collapse of the groove segment within the bending region.

Utilizing the bending strain within a bending region of a sidewall avoids the need to compress the air tube by pinching the air tube against a relatively hard barrier such as the tire assembly rim. Potential damage to the air tube from contact with the rim is thus avoided and the structural integrity of the air tube is preserved throughout the life cycle of the tire.

During operation, the groove surfaces may experience cracking due to excess stress and strain due to the repetitive bending. Such cracking may lead to reduce pumping efficiency for the peristaltic tube. To reduce the likelihood of cracking in the groove surfaces, the groove surfaces include a rubber composition as further described.

Again referring to FIGS. 1, 2 and 3, the groove surfaces 128, 130, 136, 138 comprise the rubber composition.

The rubber composition includes a self-lubrication agent capable of migrating from the rubber composition to the groove surface and disposing on the groove surface as a liquid. By self-lubricating, it is meant that the self-lubrication agent will migrate by diffusion or otherwise from the bulk of the rubber composition to the groove surface, whereon the agent exists in liquid form to act as a lubricant to reduce the likelihood of cracking in the groove surface. Self-lubricating agents that may solidify at the surface are not usable, as the formation of the solid may cause blockage of the air passageway.

Suitable self-lubrication agents include liquids having a melting points of less than 0° C. In one embodiment, the self-lubrication agents has a melting points of less than −10° C. Melting point may be determined by methods as are known in the art, including ASTM D5440-93.

The self-lubrication agent may include an oil. Suitable oils include, paraffinic, and vegetable oils. Suitable vegetable oils include canola (rapeseed) oil, sunflower oil, soybean oil, castor oil, and the like.

In one embodiment, the rubber composition includes from 0.25 to 5 phr of the self-lubrication agent. In another embodiment, the rubber composition includes from 0.5 to 1.5 phr of the self-lubrication agent.

The rubber composition includes a vulcanization modifier.

In one embodiment, the vulcanization modifier for use in the second rubber composition include α,ω-bis(N,N'-dihydrocarbylthiocarbamamoyldithio)alkanes, bismaleimides, and biscitraconimides.

In one embodiment, the vulcanization modifier is a α,ω-bis(N,N'-dihydrocarbylthiocarbamamoyldithio)alkanes. Suitable α,ω-bis(N,N'-dihydrocarbylthiocarbamamoyldithio)alkanes include 1,2-bis(N,N'-dibenzylthiocarbamoyldithio)ethane; 1,3-bis(N,N'-dibenzylthiocarbamoyldithio)propane; 1,4-bis(N,N'-dibenzylthiocarbamoyldithio)butane; 1,5-bis(N,N'-dibenzylthiocarbamoyl-dithio)pentane; 1,6-bis(N,N'-dibenzylthiocarbamoyldithio)hexane; 1,7-bis(N,N'-dibenzylthiocarbamoyldithio)heptane; 1,8-bis(N,N'-dibenzylthiocarbamoyldithio)octane; 1,9-bis(N,N'-dibenzylthiocarbamoyldithio)nonane; and 1,10-bis(N,N'-dibenzylthiocarbamoyldithio)decane. In one embodiment, the vulcanization modifier is 1,6-bis(N,N'-dibenzylthiocarbamoyldithio)hexane available as Vulcuren® from Bayer.

In one embodiment, the vulcanization modifier is a bismaleimide. Suitable bismaleimides include N,N'-m-phenylene bismaleimide, available as HVA-2 from DuPont.

In one embodiment, the vulcanization modifier is a citraconimide. Suitable citraconimidies include N,N'-m-xylylene biscitraconimide, also known as 1,3-bis(citraconimidomethyl)benzene, available as Perkalink® 900 from Flexsys.

In one embodiment, the rubber composition in one or more annular segments may comprise from about 1 to about 15 parts by weight, per 100 parts by weight of elastomer (phr), of the vulcanization modifier. In another embodiment, the rubber composition may comprise from about 2 to about 8 phr of vulcanization modifier.

The rubber composition includes one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl)tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoyl-thio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook*(1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Again with reference to FIGS. 1, 2, and 3 the rubber composition may be incorporated into the internal surfaces of groove 126 in a variety of ways. In one embodiment, the chafer 120 including the groove 126 and groove surfaces 128, 130, 136, 138 is constructed wholly from the rubber composition, as by extrusion. The tube 42 may then be included in the groove 128.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

What is claimed is:
1. A self-inflating tire assembly comprising:
a rim having a tire mounting surface extending between first and second rim flanges;
a tire mounted to the rim tire mounting surface, the tire having a tire cavity, first and second sidewalls extending respectively from first and second tire bead regions to a tire tread region;
the first sidewall having at least one bending region operatively bending within a rolling tire footprint responsive to a bending strain, whereby the bending region in a bending condition within said rolling tire footprint having a bending strain neutral axis, a compression side of the neutral zone, and an elongation side of the neutral zone;
a sidewall groove positioned within the compression side of the neutral axis of the one said bending region of the first tire sidewall;
an air tube positioned within the sidewall groove in contacting engagement with opposite groove surfaces at least partially surrounding the air tube, the sidewall groove operatively bending within the bend region responsive to the bending strain within the rolling tire footprint to compress the air tube from an expanded diameter to a flat diameter adjacent the rolling tire footprint, whereby forcing evacuated air from a flattened air tube segment along the air passageway;
the opposite groove surfaces comprising a rubber composition, the rubber composition comprising:
a diene based rubber;
from 0.25 to 5 parts by weight, per 100 parts by weight of rubber (phr), of castor oil; and
from 1 to 15 parts by weight, per 100 parts by weight of rubber (phr), of a vulcanization modifier selected from the group consisting of α,ω-bis(N,N'-dihydrocarbylthiocarbamamoyldithio)alkanes, bismaleimides, and bis-citraconimides.

2. The tire assembly of claim 1, wherein the air tube and the sidewall groove are located within a sidewall region of the first tire sidewall above an upper boundary of the rim.

3. The tire assembly of claim 2, wherein the groove surfaces contact the air tube and bend within a footprint of a rotating tire to operatively close an air tube segment within the tire footprint.

4. The tire assembly of claim 3, wherein the air tube comprises an annular body extending substantially a circumference of a tire first sidewall.

5. The tire assembly of claim 4, wherein the sidewall groove is annular and located proximally above the upper boundary of the rim.

6. The tire assembly of claim 1, wherein the groove extends into an annular, substantially axially extending, sidewall surface.

7. The tire assembly of claim 6, wherein the annular sidewall surface comprises a substantially axially oriented surface of a tire chafer protrusion located in non-contacting relationship with the rim, the groove extending into the annular sidewall surface in substantially a radial direction.

8. The tire assembly of claim 1, wherein the sidewall groove includes a sidewall groove opening operatively sized to closely admit the air tube.

9. The tire assembly of claim 8, wherein substantially the entirety of the air tube resides within the sidewall groove.

10. The tire assembly of claim 9, wherein first and second angled groove surfaces define opposite sides of the sidewall groove, each angled groove surface comprising first and second tube contacting surfaces adjoining at an angled intersection, and wherein the tube contacting surfaces of the first and second angled groove surfaces operatively contact the air tube at space apart intervals surrounding and substantially circumscribing the air tube.

11. The tire assembly of claim 10, wherein the first and second angled groove surfaces converge and join at an inward terminal groove end and operatively flex inwardly about the terminal groove end to constrict the sidewall groove and flatten a footprint segment of the air tube within the groove.

12. The tire assembly of claim 11, wherein the groove narrows toward the terminal groove end.

13. The tire assembly of claim 12, wherein an inward portion of the groove at the terminal groove end is substantially U-shaped.

14. The tire assembly of claim 13, wherein the first and second angled groove surfaces converge toward the inward portion of the groove.

15. The tire assembly of claim 14, wherein the groove extends into an annular, substantially axially extending, sidewall surface.

16. The tire assembly of claim 15, wherein the annular sidewall surface comprises a substantially axially oriented surface of a tire chafer protrusion located in non-contacting relationship with the rim and the groove extending into the annular sidewall surface in substantially a radial direction.

17. The tire assembly of claim 1, wherein the sidewall groove is positioned within the compression side of the neutral axis of the one said bending region of the first tire sidewall at a substantially maximum distance from the neutral axis.

18. The tire assembly of claim 1, wherein the castor oil is present in an amount ranging from 0.5 to 1.5 phr.

* * * * *